UNITED STATES PATENT OFFICE.

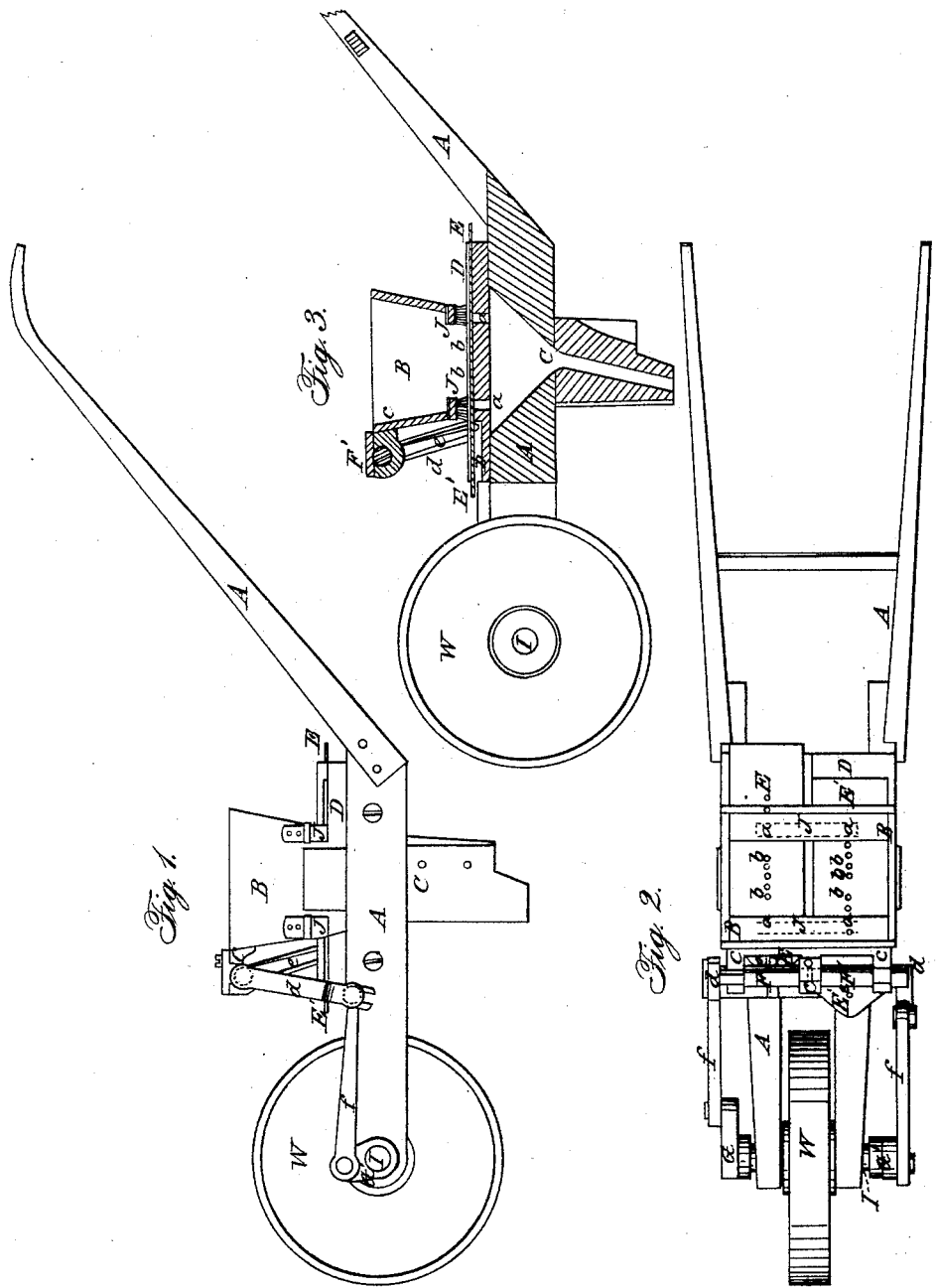

JOHN W. RICHARDS, OF NEWARK, NEW JERSEY.

IMPROVEMENT IN SEEDING-MACHINES.

Specification forming part of Letters Patent No. 45,344, dated December 6, 1864.

*To all whom it may concern:*

Be it known that I, JOHN W. RICHARDS, of the city of Newark, county of Essex, and State of New Jersey, have invented certain new and useful Improvements in Seeding-Machines; and I do hereby declare that the following is a full, clear, and exact description of the same, reference being had to the accompanying drawings, forming part of this specification, in which—

Figure 1 is a side view of a machine with my improvements. Fig. 2 is a plan of the same. Fig. 3 is a longitudinal vertical section of the same. Fig. 4 is an end view of the axle.

Similar letters of reference indicate corresponding parts in the several figures.

This invention relates to that class of seeding-machines in which the seed is received from a hopper in measured quantities by holes in slides, which derive a reciprocating motion from a wheel or wheels on which the machine runs and delivered by the said slides through a tube or conductor.

It consists in the employment of two slides so combined with two cranks set at right angles to each other on the rotating axle of the said wheel or wheels as to cause the seed to be delivered from one and the other of the two slides alternately into one conductor and so deposited in the ground at regular distances.

To enable others skilled in the art to make and use my invention, I will proceed to describe it with reference to the drawings.

A is the frame of the machine, furnished with a wheel, W, and having the general form of a wheelbarrrow.

B is the hopper in which the seed is placed, and C is the single conductor down which it passes to the ground. D is a flat stationary board or plate arranged between the hopper and conductor, and having two slots, *a a*, extending entirely or nearly across it, one near the front and the other near the back of the hopper.

E E' are the slides, consisting of flat plates or boards of suitable thickness arranged side by side at the bottom of the hopper and above the board D, and fitted to slide back and forth between suitable guides, *e e*. Along the center of each slide there is a row of holes, *b b*, of such size as to be each capable of containing the quantity or number of seed to be deposited in one spot, the arrangement of the said holes being such that by the longitudinal movement of the slides they will severally be caused to pass over one of the slots. Two or more sets of slides may be provided with holes of different sizes to enable the same machine to be used for different kinds of seed.

F F' are two horizontal rock-shafts arranged in line with each other transversely to the machine in suitable bearings, *c c*, in front of and near the top of the hopper. Each of these rock-shafts has two arms, *d* and *e*, the latter entering a hole in the front part of one of the slides E E' and the former being connected by a rod, *f*, with one of the two cranks G G', which are fast upon the rotary axle I of the said wheel W and set at right angles to each other.

J J are stationary brushes fitted to the bottom of the hopper, at the front and back thereof, in such manner as to press upon the slides E E' directly over the slots *a a* in the plate or board D below. These brushes serve to sweep the seed into the holes *b b*, and by being arranged directly over the slots *a a* are also made to press the seed through the holes *b b* into the slots *a a*, which, being wider than *b b*, allow it to pass freely down to the conductor. By providing holes *b b* and brushes J J both at the front and back of the hopper the slides E E' are made to receive the seed and convey it to the conductor both in their backward and forward movements. The arms *d* and *e* are respectively so arranged that first a hole *b* of one slide then a hole *b* of the other will come over one of the slots *a a*, and hence the arrangement of the cranks at right angles to each other, so that each slide will move quickest when the other moves slowest, will cause the seed to be deposited at regular distances.

If it be desired to sow the seed in two or more rows, I propose to multiply the number of slides and cranks, always using two slides operated by two cranks set at right angles to each other and in combination with one conductor for each row.

What I claim as new, and desire to secure by Letters Patent, is—

1. The combination, with one conductor, of two slides, E E', working side by side, and two cranks, G G', set at right angles to each other on the axle I, substantially as and for the purpose herein specified.

2. The slots or openings $a\ a$ and the brushes J J, arranged both at the front and at the back of the hopper, so that the slides will receive and deposit the seed both in their backward and forward movements.

JOHN W. RICHARDS.

Witnesses:
　HENRY T. BROWN,
　J. W. COOMBS.